United States Patent
Hayashi et al.

(10) Patent No.: US 7,510,616 B2
(45) Date of Patent: Mar. 31, 2009

(54) PRODUCING METHOD OF RUBBER STRIP WINDING BODY, AND RUBBER STRIP WINDING APPARATUS

(75) Inventors: Norio Hayashi, Kobe (JP); Hiroyuki Onimatsu, Kobe (JP); Youjiro Miki, Kobe (JP)

(73) Assignee: Sunitomo Rubber Industries, Ltd., Kobe-shi (JP)

( * ) Notice: Subject to any disclaimer, the term of this patent is extended or adjusted under 35 U.S.C. 154(b) by 412 days.

(21) Appl. No.: 11/248,572

(22) Filed: Oct. 13, 2005

(65) Prior Publication Data

US 2006/0081325 A1  Apr. 20, 2006

(30) Foreign Application Priority Data

Oct. 14, 2004 (JP) .............................. 2004-300413
Dec. 2, 2004 (JP) .............................. 2004-350114

(51) Int. Cl.
*B29D 30/30* (2006.01)
*B29D 30/60* (2006.01)

(52) U.S. Cl. ...................... 156/117; 156/130; 156/189; 156/195; 156/397; 156/425

(58) Field of Classification Search ................ 156/117, 156/130, 397, 189, 195, 425
See application file for complete search history.

(56) References Cited

U.S. PATENT DOCUMENTS

| | | | |
|---|---|---|---|
| 4,240,863 A | 12/1980 | Vinton | |
| 4,279,683 A | 7/1981 | Landsness et al. | |
| 4,461,669 A * | 7/1984 | Dontscheff | 156/574 |
| 4,909,880 A * | 3/1990 | Kittelson et al. | 156/189 |
| 6,554,041 B1 * | 4/2003 | Ohki et al. | 156/397 |
| 2007/0199661 A1 * | 8/2007 | Nicolas et al. | 156/361 |

FOREIGN PATENT DOCUMENTS

| | | |
|---|---|---|
| EP | 0542431 A | 5/1993 |
| EP | 1279486 A | 1/2003 |
| EP | 1375118 A | 1/2004 |
| EP | 1533107 A | 5/2005 |
| FR | 1426617 A | 4/1966 |
| JP | 2000-94542 A | 4/2000 |
| LU | 87565 A1 | 10/1989 |

* cited by examiner

*Primary Examiner*—Geoffrey L Knable
(74) *Attorney, Agent, or Firm*—Birch, Stewart, Kolasch & Birch, LLP

(57) ABSTRACT

An unvulcanized rubber strip (3) is supplied to an outer peripheral surface of a rotating cylindrical body (4) from a sending-out roller (16) which laterally moves in an axial direction of the cylindrical body (4), thereby spirally winding the rubber strip (3) to form a winding body (5). In a tilting reference plane (29) defined as a plane which is in parallel to a plane (4S) passing through an axis (4i) of the cylindrical body (4) and which passes through an axis (16i) of the sending-out roller (16), the sending-out roller (16) is held such that the sending-out roller (16) can tilt positively and negatively within an inclination angle ($\alpha$) of 0 to 45° with respect to a tilting reference line (N) which is parallel to the axis (4i) of the cylindrical body (4). The sending-out roller (16) is laterally moved while changing the inclination angle ($\alpha$).

14 Claims, 12 Drawing Sheets

PRODUCING METHOD OF RUBBER STRIP WINDING BODY, AND RUBBER STRIP WINDING APPARATUS

BACKGROUND OF THE INVENTION

1. Field of the Invention

The present invention relates to a producing method of a rubber strip winding body, and a rubber strip winding apparatus capable of enhancing precision and quality of a winding body formed by spirally winding a rubber strip around a cylindrical body.

2. Description of the Related Art

As a pneumatic tire is required to show different characteristics depending on the part, it is composed of various rubber members such as a tread rubber, a sidewall rubber, a clinch rubber, a breaker cushion rubber, an inner liner rubber and the like having different compositions and cross sections.

In recent years, it is proposed to form various kinds of tire rubber members that are formed by winding the rubber strip spirally using a so-called strip wind method. See Japanese Patent Application Laid-open No. 2000-94542.

In the case of this strip wind type, as roughly shown in FIG. 10, when an unvulcanized rubber strip (b) is supplied to an outer peripheral surface (cs) of a cylindrical body (c) from a sending-out roller (a), the sending-out roller (a) is laterally moved in the axial direction of the cylindrical body (c) as the cylindrical body (c) rotates. With this, a winding body (d) in which the rubber strip (b) is partially overlapped and spirally wound is formed. The cylindrical body (c) includes a former for forming a tire, and a tire member formed on such former.

In order to obtain a targeted shape of the winding body (d) in cross section, it is important to precisely control the lateral moving amount and the moving speed of the sending-out roller (a) during winding.

SUMMARY OF THE INVENTION

In a conventional strip wind method, sending-out roller (a) is laterally moved in the axial direction (i) of the cylindrical body (c) while an axis of the sending-out roller (a) is held in parallel to the axis of the cylindrical body (c). On the other hand, the rubber strip (b) is partially overlapped and is pasted in succession at an angle with respect to the axial direction (i).

Therefore, as shown in FIG. 11 in an exaggerated manner, a torsion (k) between the sending-out roller (a) and the cylindrical body (c) is applied to the rubber strip (b), and with this, the rubber strip (b) is pasted with a moving amount smaller than a moving amount of the sending-out roller (a). Hence, as the winding operation proceeds, a deviation between a position of the actually pasted rubber strip (b) and a position of the sending-out roller (a) is increased. Then, at a certain round of winding (m) where the deviation reaches its limitation, the rubber strip is largely deviated laterally, and catches up the position of the sending-out roller (a). This phenomenon is repeated and the rubber strip (b) is wound with an inconsistent pitch, preventing the rubber strip (b) being wound with a target pitch (P). As a result, there is a problem that the target cross section shape of the winding body (d) is warped, and this deteriorates the quality and precision of the winding body (d), a defect such as bare is generated in a vulcanized tire surface, and tire uniformity is deteriorated.

On the other hand, the strip wind method may be used in forming a tread rubber for an automatic two-wheeled vehicle, and in such a case, as shown in FIG. 12, a drum whose diameter is large in the central portion as compared to the end portions is used as the cylindrical body (c). When the cylindrical body (c) has non-linear cylindrical contour shape, if the rubber strip (b) is wound around the outer peripheral surface of the cylindrical body (c), large torsion and error are generated in the rubber strip (b), and there is a problem that the quality and precision of the winding body (d) are deteriorated.

Hence, based on a structure in which the sending-out roller is laterally moved while changing the inclination angle of the axis of the sending-out roller, it is an object of the present invention to provide a producing method of a rubber strip winding body, and a rubber strip winding apparatus capable of suppressing torsion of the rubber strip, capable of enhancing the winding precision, and capable of forming a high quality and high precision winding body having a cross section closer to the target stably.

In accordance with the present invention, there is provided a method of producing a rubber strip winding body in which an unvulcanized rubber strip (3) is supplied to an outer peripheral surface of a rotating cylindrical body (4) from a sending-out roller (16) which laterally moves in an axial direction of the cylindrical body (4), thereby spirally winding the rubber strip (3) to form a winding body (5), characterized in that in a tilting reference plane (29) defined as a plane which is in parallel to a plane (4S) passing through an axis (4i) of the cylindrical body (4) and which passes through an axis (16i) of the sending-out roller (16), the sending-out roller (16) is held such that the sending-out roller (16) can tilt positively and negatively within an inclination angle ($\alpha$) of 0 to 45° with respect to a tilting reference line (N) which passes through a bisector point (No) on the axis (16i) which bisects a length of the sending-out roller (16) and which is parallel to the axis (4i) of the cylindrical body (4), the sending-out roller (16) is laterally moved while changing the inclination angle ($\alpha$).

An invention described in claim 2 is In accordance with the present invention, there is provided a rubber strip winding apparatus in which an unvulcanized rubber strip (3) is supplied to an outer peripheral surface of a rotating cylindrical body (4) from a sending-out roller (16) which laterally moves in an axial direction of the cylindrical body (4), thereby spirally winding the rubber strip (3) to form a winding body (5), characterized in that the rubber strip winding apparatus comprises an applicator (17) having the sending-out roller (16), the applicator (17) comprises laterally moving means (21) which laterally moves the sending-out roller (16) along an X-axis direction which is parallel to the axis (4i) of the cylindrical body (4), vertically moving means (22) which forwardly and backwardly moves the sending-out roller (16) toward the cylindrical body (4) along a Z-axis direction which intersects with the X-axis direction at right angles, and tilting means (23) for tilting the sending-out roller (16) positively and negatively within an inclination angle ($\alpha$) with respect to a tilting reference line (N) which extends in the X-axis direction through a bisector point (No) on the axis (16i) which bisects a length of the sending-out roller (16) around a reference axis (zi) of the Z-axis direction which is perpendicular to the X-axis direction and the Y-axis direction.

Since the present invention has the above-described structure, it is possible to suppress torsion of the rubber strip, to enhance the winding precision, and to form a high quality and high precision winding body having a cross section closer to the target stably.

DESCRIPTION OF THE PREFERRED EMBODIMENTS

Figure 1:
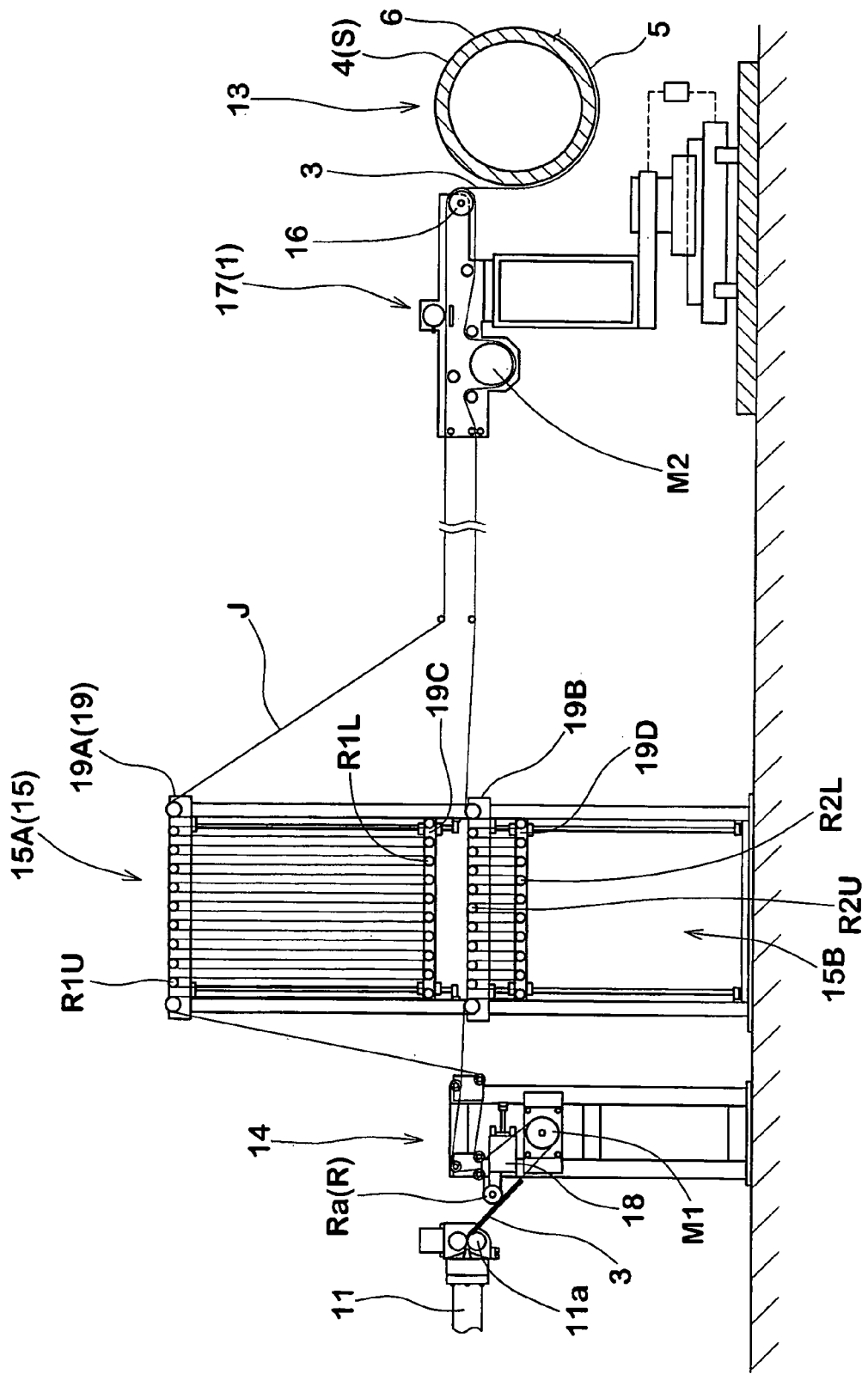
FIG. 1 is a schematic side view of a rubber strip winding apparatus of the present invention.
Figure 2:
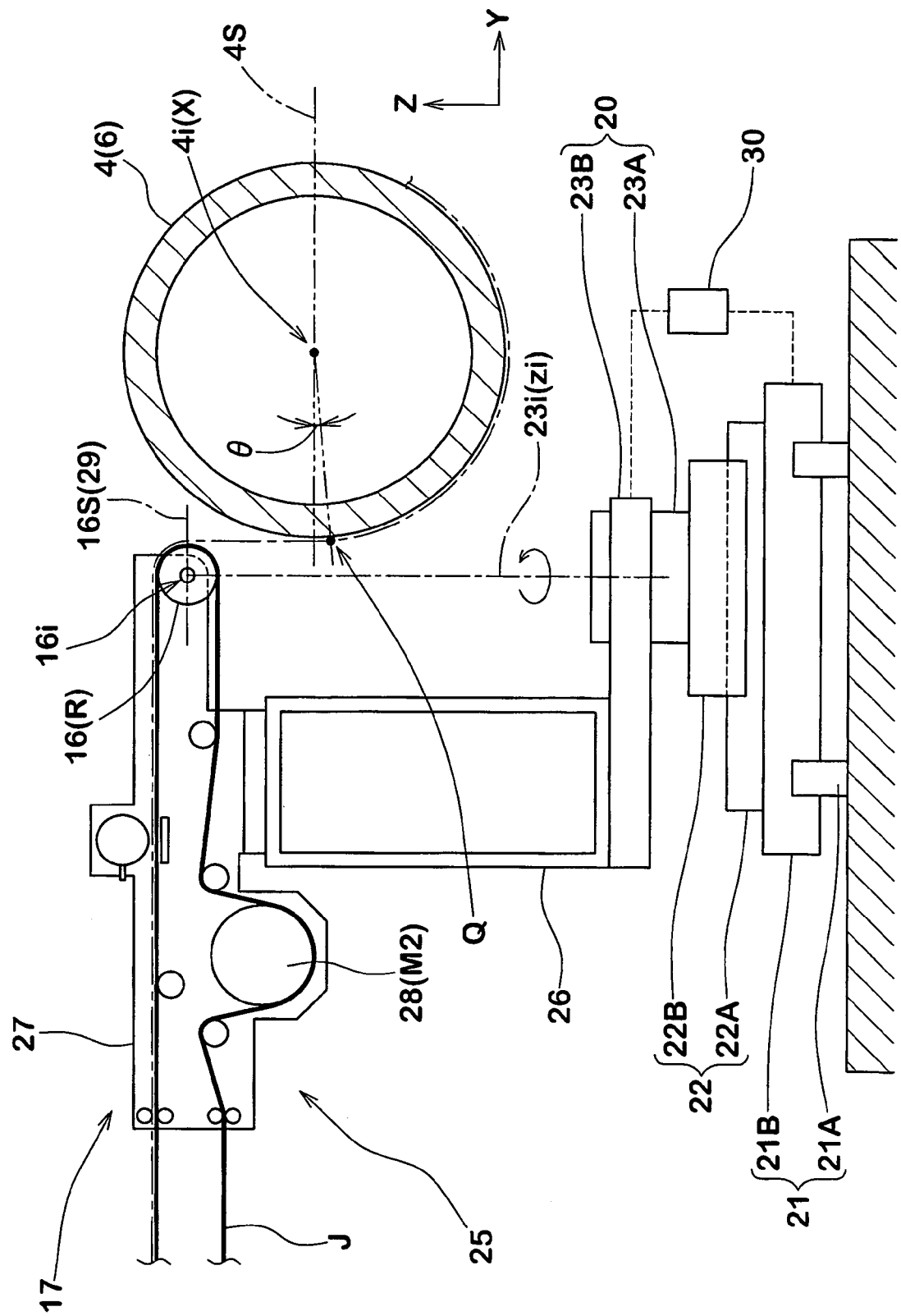
FIG. 2 is an enlarged side view of an applicator of the winding apparatus.
Figure 3:
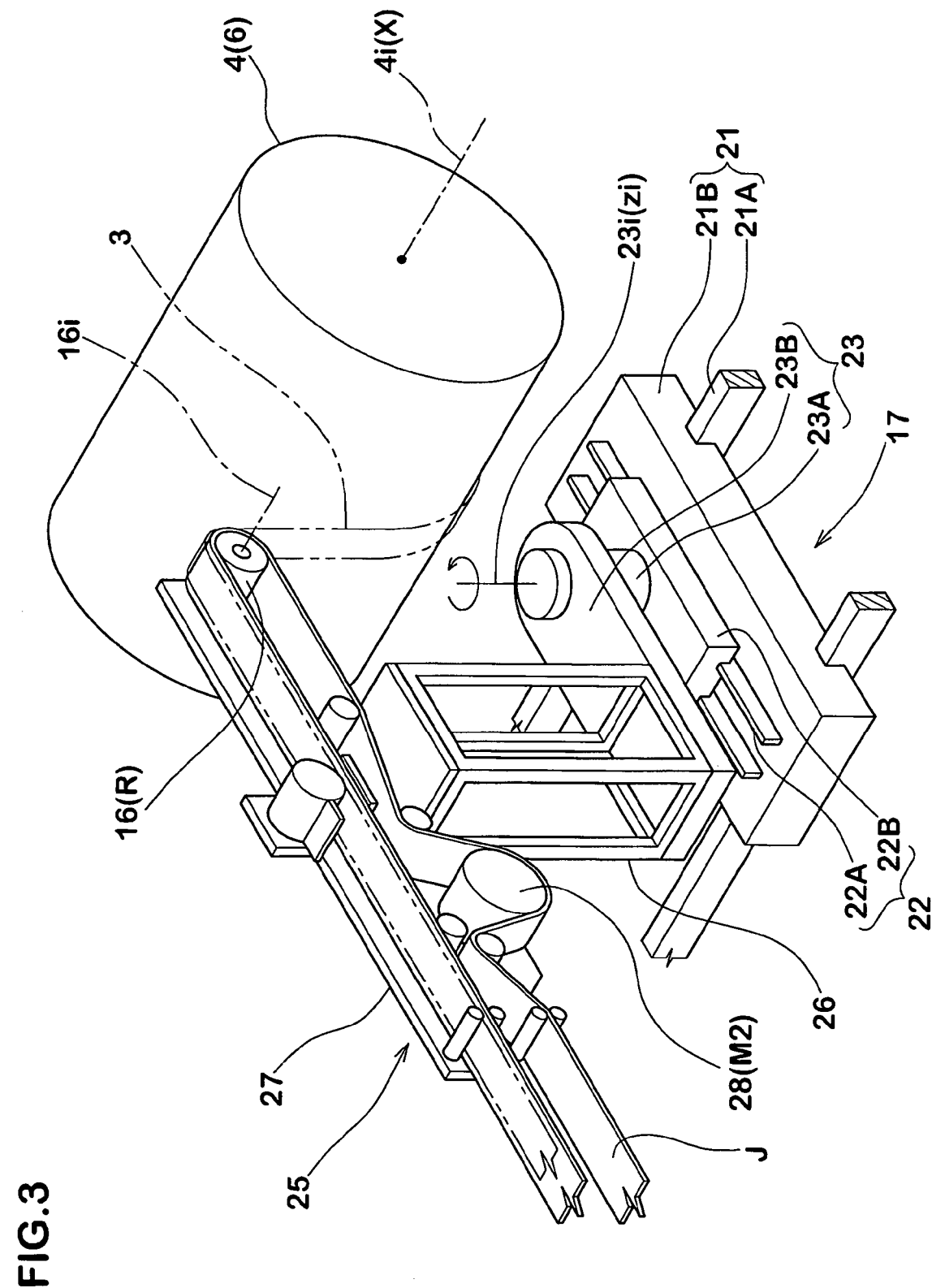
FIG. 3 is a perspective view of the applicator.

An embodiment of the present invention will be explained with illustrated examples. FIG. 1 is a schematic side view of a rubber strip winding apparatus of the present invention. FIG. 2 is an enlarged side view of an applicator of the winding apparatus. FIG. 3 is a perspective view of the applicator.

As shown in FIG. 1, the rubber strip winding apparatus 1 of the embodiment is disposed between a rubber extruding machine 11 and a forming apparatus 13 which rotatably supports a cylindrical body 4. An unvulcanized tape-like rubber strip 3 extruded from the rubber extruding machine 11 is spirally wound on an outer peripheral surface S of the cylindrical body 4, thereby forming a winding body 5.

Figure 6:
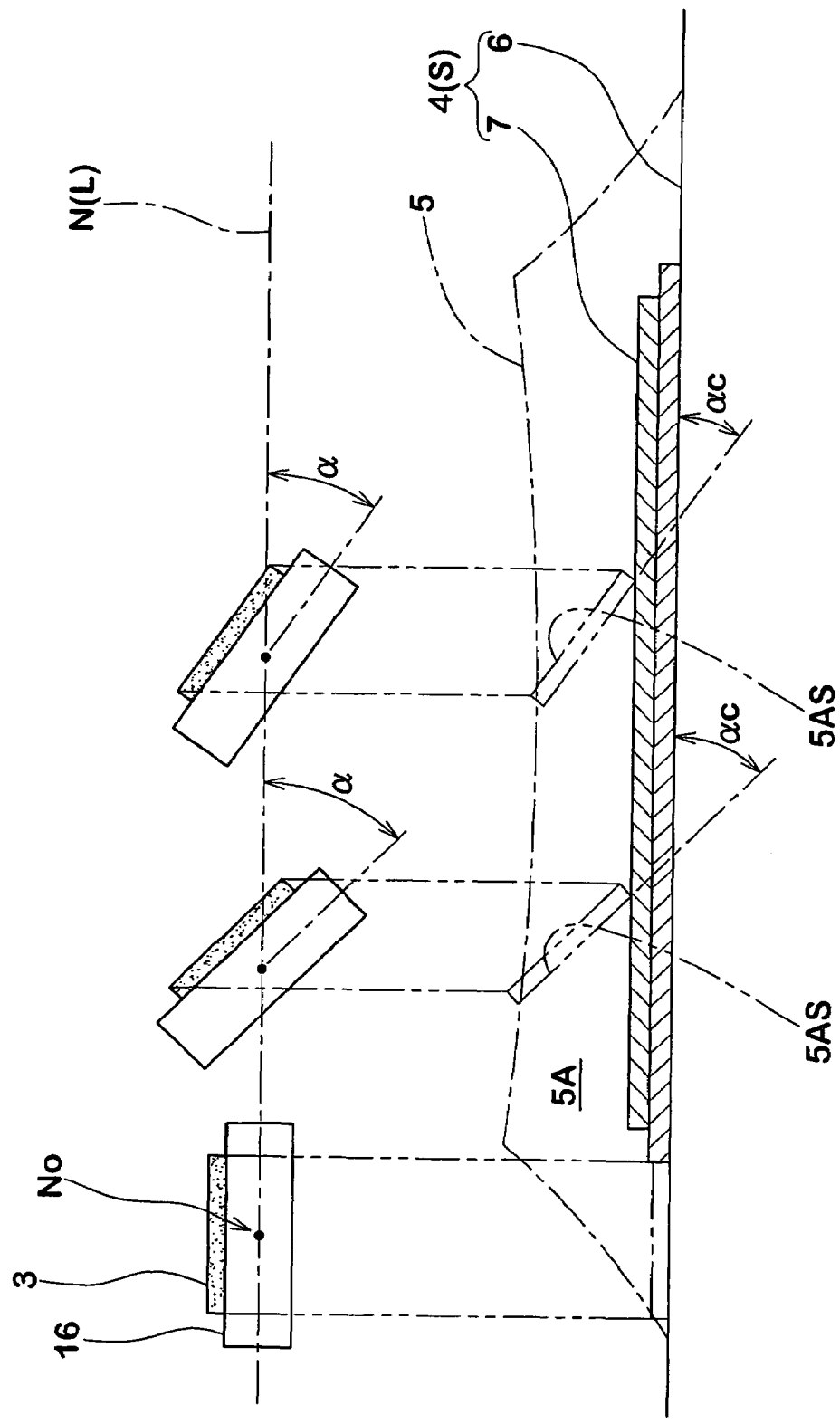
FIG. 6 is a sectional view used for explaining a tilting motion of the sending-out roller.

In this example, as shown in FIG. 6, the cylindrical body 4 comprises a straight cylindrical former 6 for forming a tire tread, and a tread reinforcing layer 7 such as a belt layer formed on the former 6. The winding body 5 for tread rubber which is a tire rubber member is formed on an outer surface S of the cylindrical body 4.

The winding apparatus 1 includes an inexpansible conveyer tape J which is guided by a plurality of rollers R such that the conveyer tape J can run around. The rubber strip 3 is adhered to and held on one surface of the conveyer tape J and is conveyed. More concretely, the winding apparatus 1 comprises (1) a loader 14 for loading, on the conveyer tape J, a tip end of the rubber strip 3 sent from the rubber extruding machine 11, (2) an accumulator 15 for accumulating the rubber strip 3 by folding back the conveyer tape J, and (3) an applicator 17 having a sending-out roller 16 which sends out the rubber strip 3 to the cylindrical body 4, which laterally moves in an X-axis direction which is an axial direction i during rotation of the cylindrical body 4 to spirally wind the rubber strip 3.

The loader 14 includes a loading roller Ra which can be displaced by expansion and contraction of the cylinder 18 such that the loading roller Ra can approach and separate from a lower calender roll 11a of the rubber extruding machine 11. When the loading roller Ra abuts, the tip end of the rubber strip 3 which is adhered to the lower calender roll 11a is loaded to the conveyer tape J.

The accumulator 15 includes a forward-sending path accumulator 15A in which the conveyer tape J runs from the rubber extruding machine toward the forming apparatus, and a backward-sending path accumulator 15B in which the conveyer tape J returns from the forming apparatus. Of the accumulators, the forward-sending path accumulator 15A includes upper rollers R1U of the forward-sending path arranged in one lateral row at upper positions, and lower rollers R1L of the forward-sending path arranged in one lateral row below the upper rollers R1U, and the conveyer tape J runs in a zigzag form while being folded back between the upper and lower rollers R1U and R1L. Similarly, the backward-sending path accumulator 15B includes upper rollers R2U of the backward-sending path arranged in one lateral row at upper positions, and lower rollers R2L of the backward-sending path arranged in one lateral row below the upper rollers R2U, and the conveyer tape J runs in a zigzag form while being folded back between the upper and lower rollers R2U and R2L. At that time, the upper rollers R1U and R2U of the forward-sending path and backward-sending path are pivotally supported by fixed frames 19A and 19B, and the lower rollers R1L and R2L of the forward-sending path and backward-sending path are pivotally supported by vertically moving frames 19C and 19D which can move vertically.

The winding apparatus 1 includes a first motor M1 which continuously drives the conveyer tape J in synchronism with the rubber extruding machine 11, and a second motor M2 which intermittently drives the conveyer tape J in synchronism with the former 6. When the former 6 is stopped, the conveyer tape J accumulated in the backward-sending path accumulator 15B is taken out by the rotation of the driving rollers by the first motor M1, the rubber strip 3 is adhered to the conveyer tape J and then, the conveyer tape J is automatically accumulated in the forward-sending path accumulator 15A. During the operation of the former 6, on the other hand, the conveyer tape J having the rubber strip accumulated in the forward-sending path accumulator 15A is taken out by the rotation of the driving rollers by the second motor M2, and the rubber strip 3 is supplied to the cylindrical body 4 from the sending-out roller 16.

Next, as shown in FIGS. 2 and 3, the applicator 17 includes (I) a laterally moving means 21 which laterally moves the sending-out roller 16 along the X-axis direction which is in parallel to the axial direction i, (II) a vertically, or longitudinally, moving means 22 which forwardly and backwardly moves the sending-out roller 16 toward the cylindrical body 4 along the Y-axis direction which is perpendicular to the X-axis direction, and (III) a tilting means 23 which positively and negatively tilts the sending-out roller 16 with respect to a tilting reference line xj of the X-axis direction around a reference axis zi of the Z-axis direction which is perpendicular to the X-axis direction and Y-axis direction.

The laterally moving means (21) includes a lateral guide rail 21A laid in the X-axis direction, and a laterally moving stage 21B guided by the lateral guide rail 21A and can be moved laterally. The laterally moving stage 21B is connected to a motor (not shown) through driving force transmitting means of a known structure such as a ball screw mechanism, a gear connecting mechanism and a belt connecting mechanism. The vertically moving stage 21B can move forwardly and backwardly at required speed through a required distance by controlling the rotation of the motor.

The vertically moving means 22 includes a vertical guide rail 22A which is laid on the laterally moving stage 21B and which extends in the Z-axis direction, and a vertically moving stage 22B which is guided by the vertical guide rail 22A and can move forwardly and backwardly toward the former 6. Like the laterally moving stage 21B, the vertically moving stage 22B is also connected to a motor (not shown) through driving force transmitting means of a known structure such as a ball screw mechanism, a gear connecting mechanism and a belt connecting mechanism. The vertically moving stage 22B can forwardly and backwardly move at required speed through a required distance by controlling the rotation of the motor.

The tilting means 23 includes a support shaft 23A which stands on the vertically moving stage 22B, and a tiltable stage 23B supported by the support shaft 23A. The support shaft 23A is pivotally attached to the tiltable stage 23B such that the tiltable stage 23B can tilt around the reference axis zi which is an axis 23i of the support shaft 23A. A drive motor (not shown) is connected to the tiltable stage 23B, the motor rotates at any speed around the reference axis zi, and the rotation angle thereof is detected and controlled by an angle sensor such as an encoder. The laterally moving means 21 and the vertically moving means 22 may be exchanged. That is, the laterally moving stage 21B can be disposed on the vertically moving stage 22B such that the laterally moving stage 21B can laterally move, and the tiltable stage 23B can be pivotally attached to the laterally moving stage 21B such that the tiltable stage 23B can tilt.

In this embodiment, a table-like frame 26 stands on the tiltable stage 23B, and a strip guide 25 on which the plurality of rollers R including the sending-out roller 16 is formed on the tiltable stage 23B. In this embodiment, in the strip guide 25, the rollers R are pivotally attached to a long plate-like support arm 27 mounted on the frame 26. The roller R at least includes the sending-out roller 16 disposed on a front end of the support arm 27, and a large-diameter drive roller 28 which drives the conveyer tape J in synchronism with the rotation of the former 6 in association with the second motor M2.

Figure 4:
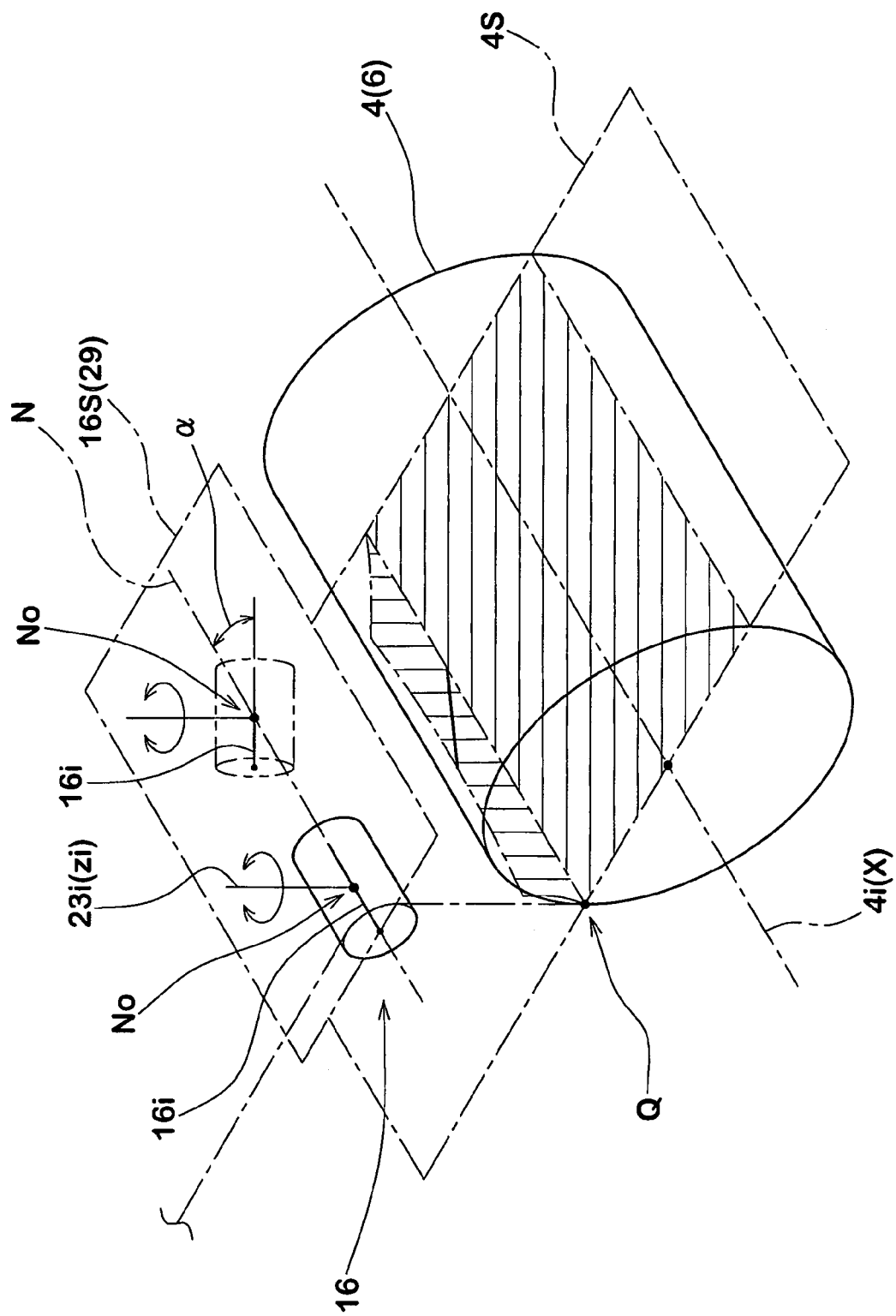
FIG. 4 is a perspective view used for explaining a positional relation between a tilting reference plane and a sending-out roller.

As shown in FIG. 4, in the applicator 17, a plane 16S which is in parallel to a plane 4S which passes through an axis i of the cylindrical body 4 and passing through an axis 16i of the sending-out roller 16 is defined as a tilting reference plane 29, and the sending-out roller 16 is held within the tilting reference plane 29 such that the sending-out roller 16 can tilt. More specifically, the axis 16i of the sending-out roller 16 is disposed in the tilting reference plane 29 which is perpendicular to the Z-axis direction. At that time, in this embodiment, the plane 4S is formed such that the rubber strip 3 from the sending-out roller 16 passes through a contact position Q which is in contact with the cylindrical body 4. The sending-out roller 16 is held such that it can tilt positively and negatively with respect to a tilting reference line N on the tilting reference plane 29 at an inclination angle $\alpha$ of 0 to 45°. Here, the "tilting reference line N" means a straight line which passes through a point (bisector point) No on the axis 16i which bisects a length of the sending-out roller 16 and extends in the X-axis direction. This embodiment shows a case in which the plane 4S and the tilting reference plane 29 are different surfaces. However, the tilting reference plane 29 may pass through the axis i of the cylindrical body 4, i.e., the tilting reference plane 29 and the plane 4S may be the same surface.

Figure 5:
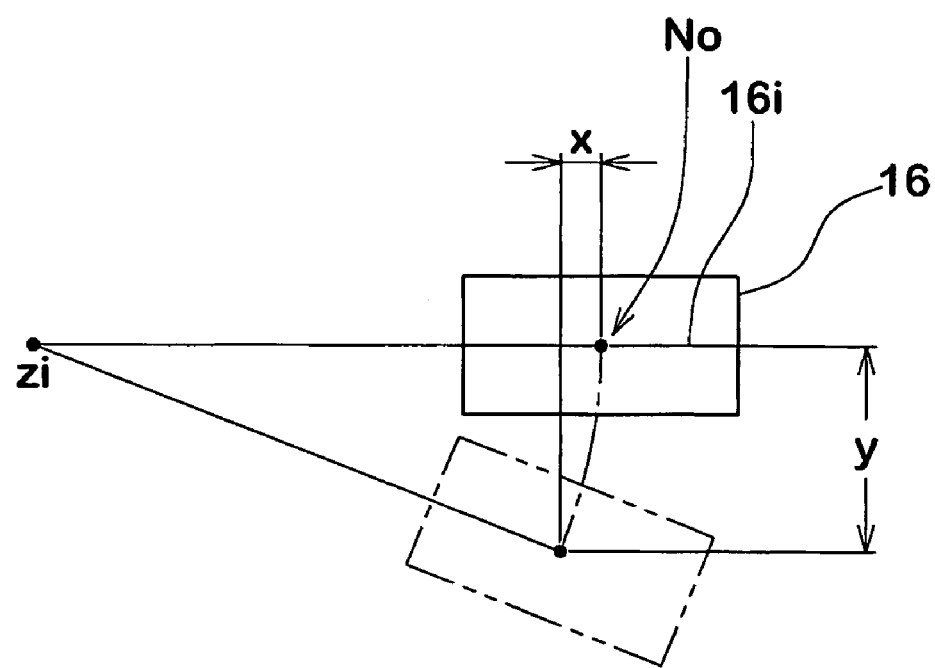
FIG. 5 is a schematic diagram showing a motion of the sending-out roller when a reference axis does not pass through a bisector point.

This embodiment shows a case in which the reference axis zi passes through the bisector point No. This can facilitate the control of the tilting motion of the sending-out roller 16. If the reference axis zi does not pass through the bisector point No, as shown in FIG. 5, errors x and y in the X-axis direction and Y-axis direction are generated at the position of the bisector point No by the tilting motion, it becomes necessary to always correct the errors by the laterally moving means 21 and the vertically moving means 22 and thus, this complicates the control. Thus, in this embodiment, the tilting motion is carried out around the reference axis zi in the vertical Z-axis direction. Thus, the load applied in the reference axis zi can be reduced, precision and smoothness of the tilting operation can be enhanced, and the durability of the apparatus can be enhanced.

The applicator 17 further comprises control means (30) which controls the laterally moving means (21), the vertically moving means (22) and the tilting means (23).

In this embodiment, as shown in FIG. 6, when the rubber strip 3 is wound and overlapped around the winding body portion 5A which is already formed on the cylindrical body 4, the control means 30 changes the inclination angle $\alpha$ of the sending-out roller 16 in accordance with the inclination of a wound and overlapped surface 5AS of the winding body portion 5A. That is, the control means 30 laterally moves the sending-out roller 16, and changes the inclination angle $\alpha$ of the sending-out roller 16 in accordance with an inclination angle $\alpha C$ with respect to the X-axis direction of the wound and overlapped surface 5AS. At that time, it is preferable that a lateral moving amount of the sending-out roller 16 of one turn of the cylindrical body 4 is stored, and the inclination angle $\alpha$ of the sending-out roller 16 is controlled whenever the cylindrical body 4 rotates once. If the outer surface of the cylindrical body 4 is of substantially straight cylindrical shape as in this embodiment, it is preferable that the bisector point No of the sending-out roller 16 laterally moves through one running line L extending in the X-axis direction.

By controlling the inclination angle $\alpha$ in this manner, the torsion of the rubber strip 3 between the cylindrical body 4 and the sending-out roller 16 can be reduced, and the winding precision of the rubber strip 3 can be enhanced. Therefore, it is possible to form a high quality and high precision winding body 5 having a cross section shape closer to the target stably.

To exhibit the effect of the present application more effectively, as shown in FIG. 2, it is preferable that an angle $\theta$ of the contact position Q with respect to the plane 4S is set to 60° or less, and more preferably 30° or less. There is a tendency that as the angle $\theta$ becomes greater, the above-described effect is more deteriorated. Thus, it is most preferable that the plane 4S is disposed at a position ($\theta \approx 0°$) passing through the contact position Q.

The upper limit of the inclination angle $\alpha$ of the sending-out roller 16 is 45°. If the inclination angle $\alpha$ exceeds 45°, there is an adverse possibility that slippage of the rubber strip 3 on the sending-out roller 16 and the positional deviation of the rubber strip 3 is generated, the deformation of the rubber strip 3 is increased, and a high quality and high precision winding body 5 having a cross section close to the target can not be obtained. Thus, it is preferable that the upper limit of the inclination angle $\alpha$ is 40° or less.

The inclination angle $\alpha$ of the sending-out roller is changed in accordance with the inclination angle $\alpha C$ of the wound and overlapped surface 5AS. This means that inclination angle $\alpha$ is set as a function ($\alpha = f(\alpha c)$) of the inclination angle $\alpha C$ in such a way as the inclination angle $\alpha$ is set to 0.5 times of the inclination angle $\alpha C$ as well as the inclination angle $\alpha$ matches with the inclination angle αC. As this function, various functions other than a linear function can also be employed.

Figure 7:
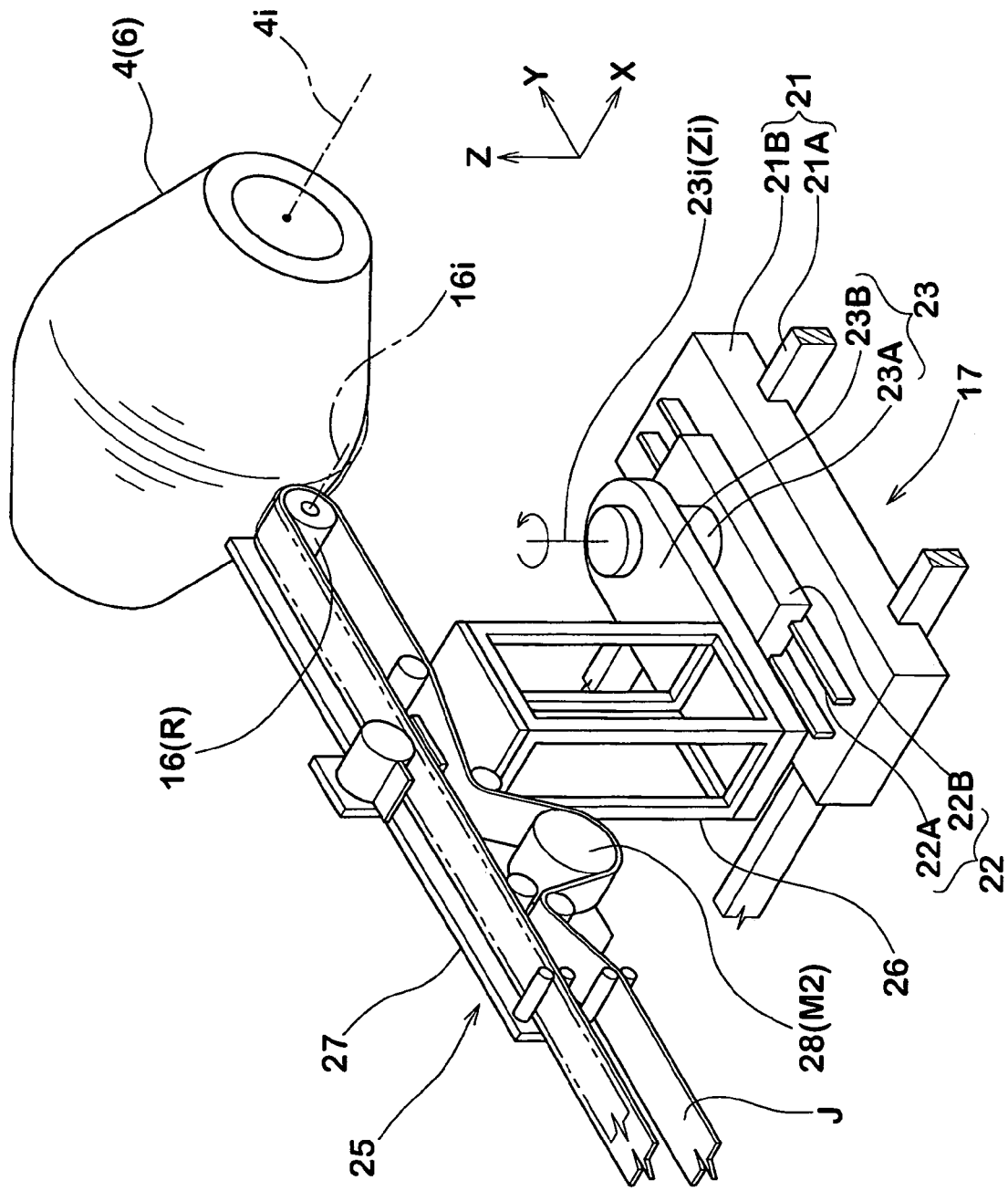
FIG. 7 is a perspective view showing a case in which a winding body for a tread rubber of a tire for an automatic two-wheeled vehicle is formed using the applicator.
Figure 8:
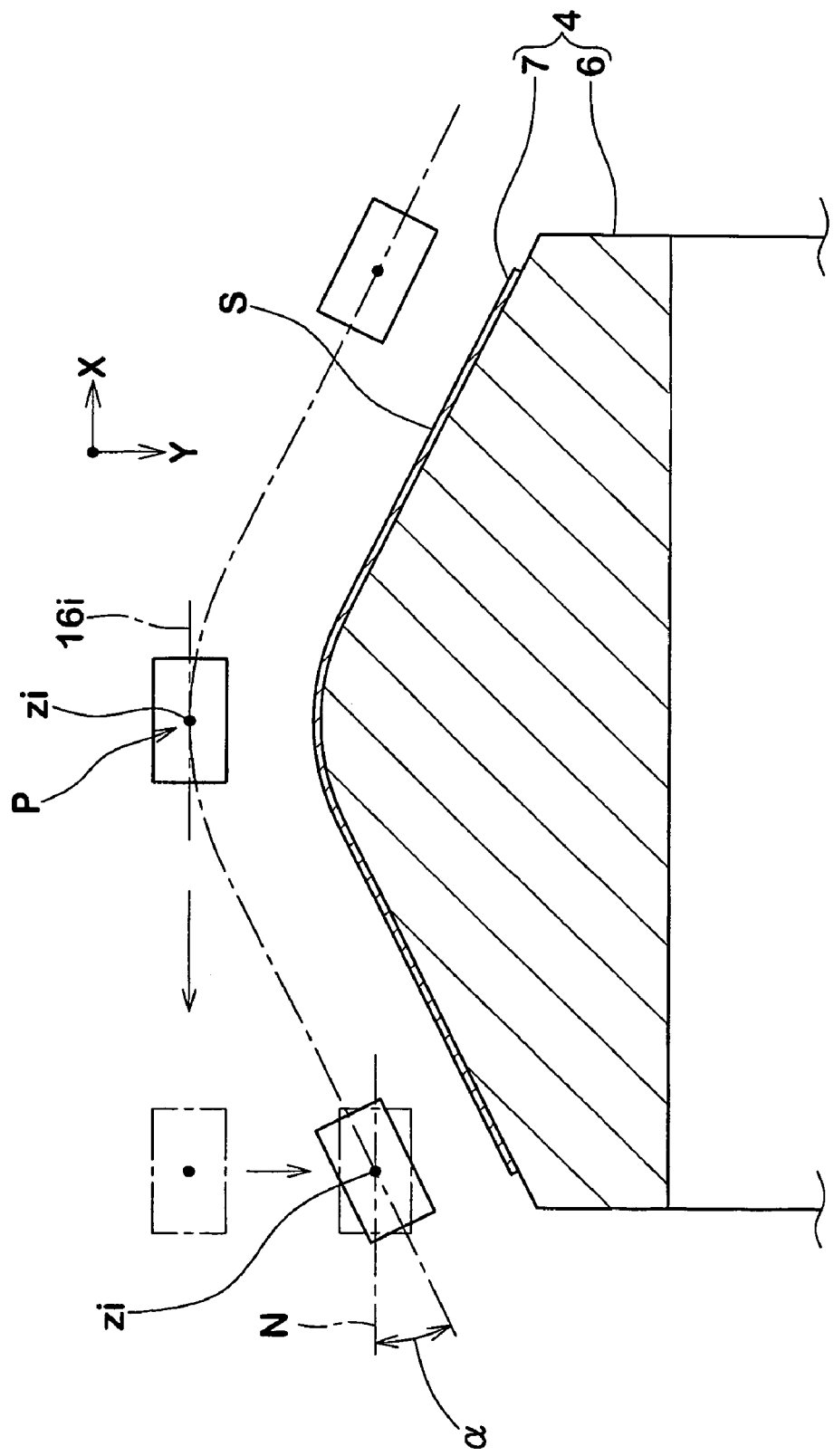
FIG. 8 is a sectional view used for explaining a tilting motion of the sending-out roller at that time.

FIGS. 7 and 8 show a case in which a winding body 5 for a tread rubber of a tire for an automatic two-wheeled vehicle is formed using the applicator 17. In this example, the cylindrical body 4 has a drum-like contour shape whose central portion has a larger diameter than those of the end portions of the drum.

The laterally moving means (21), the vertically moving means 22 and the tilting means 23 are controlled by the control means 30. The inclination angle α of the sending-out roller 16 is changed in accordance with the contour line of the cylindrical body 4 while laterally moving the sending-out roller 16. At that time, in this example, the sending-out roller 16 laterally moves such that the bisector point No of the sending-out roller 16 passes on the one running line L which is parallel to the contour line of the cylindrical body 4. With this, the distance between the sending-out roller 16 and the cylindrical body 4 becomes constant, and the torsion of the rubber strip 3 can further be suppressed. Alternatively, the sending-out roller 16 may be laterally moved such that the bisector point No passes on one running line L which is parallel to the axis 4i of the cylindrical body 4.

In this example, the tilting reference plane 29 and the plane 4S are the same surface, but the tilting reference plane 29 and the plane 4S may be different two surfaces.

Figure 9:
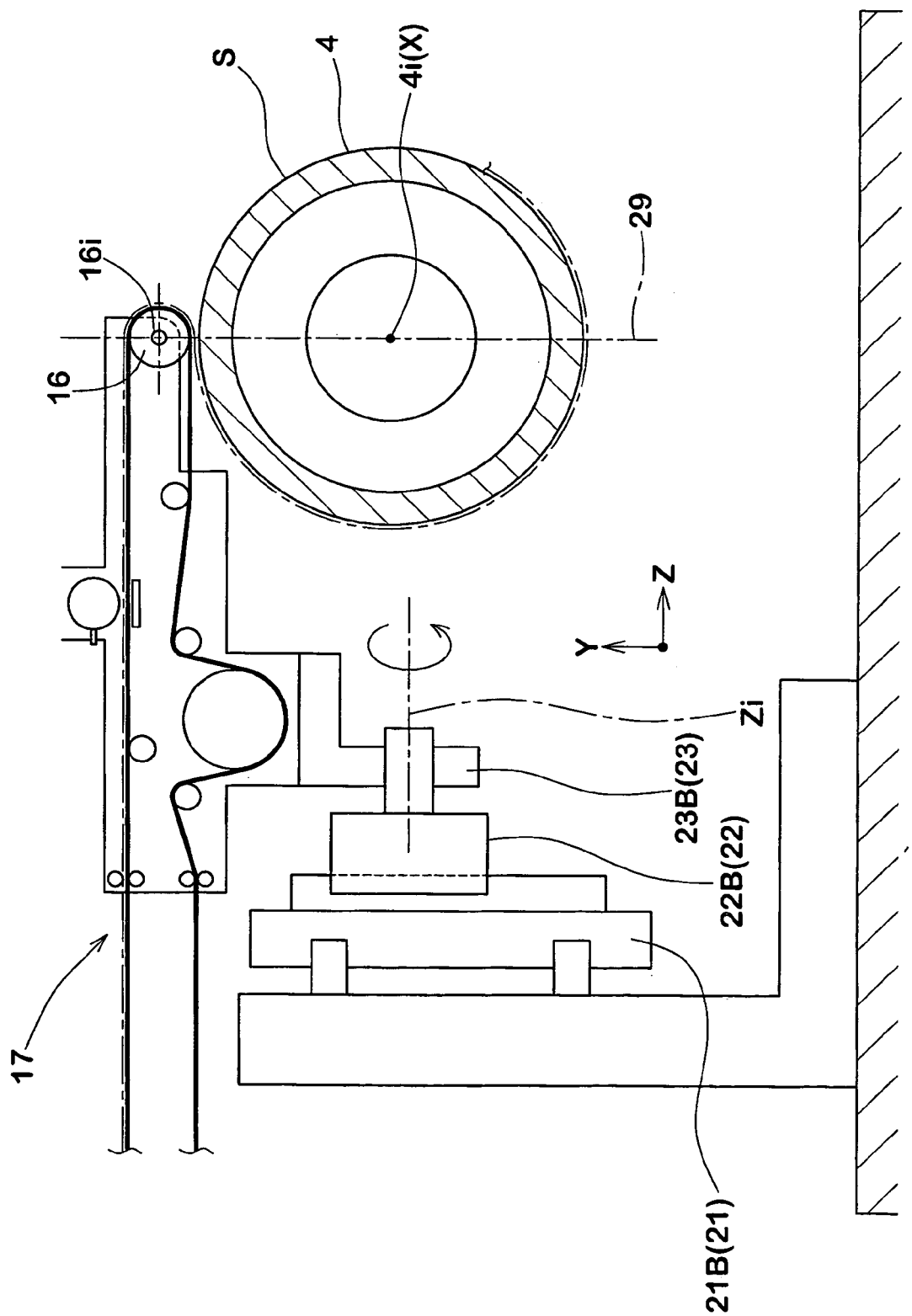
FIG. 9 is a notional side view of another example of the applicator.
Figure 10:
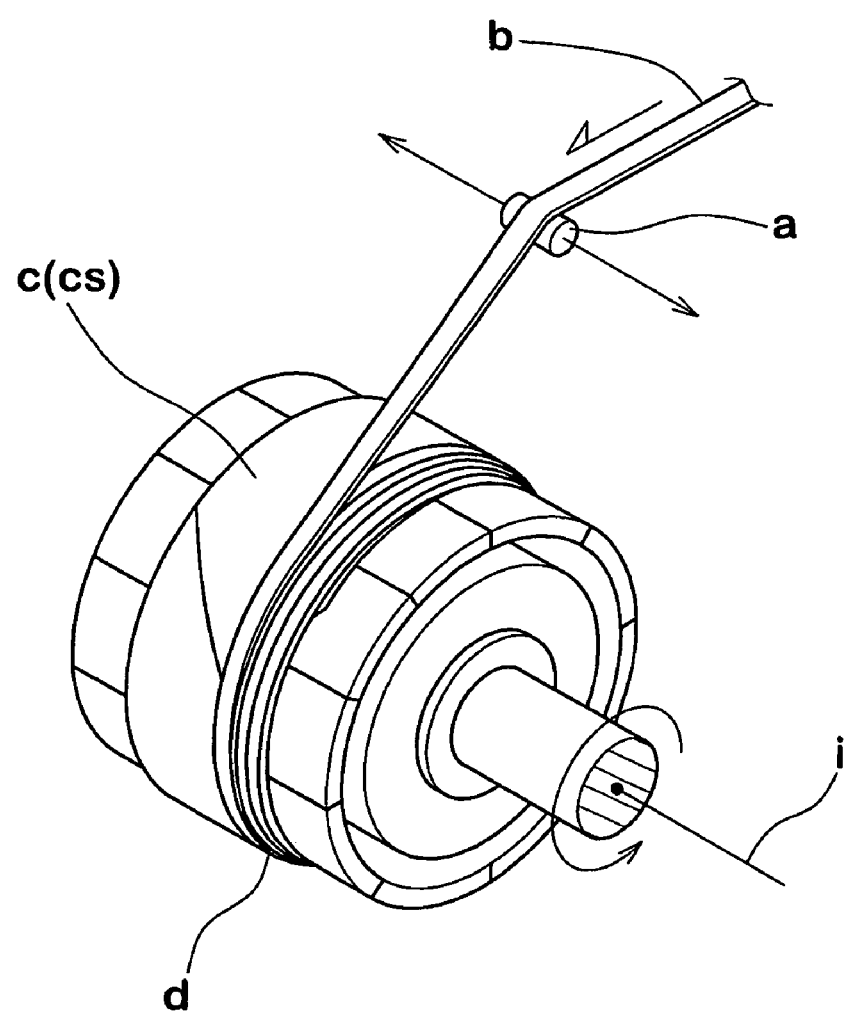
FIG. 10 is a perspective view used for explaining a conventional technique of a strip wind method.
Figure 11:
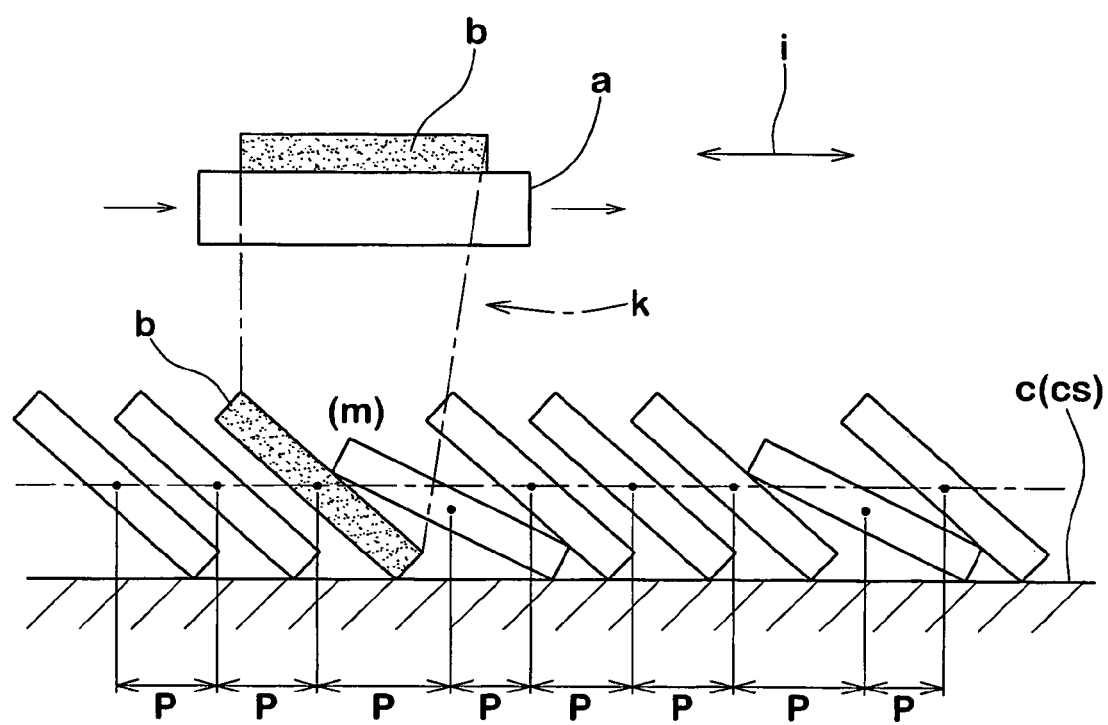
FIG. 11 is a sectional view used for explaining a conventional problem.
Figure 12:
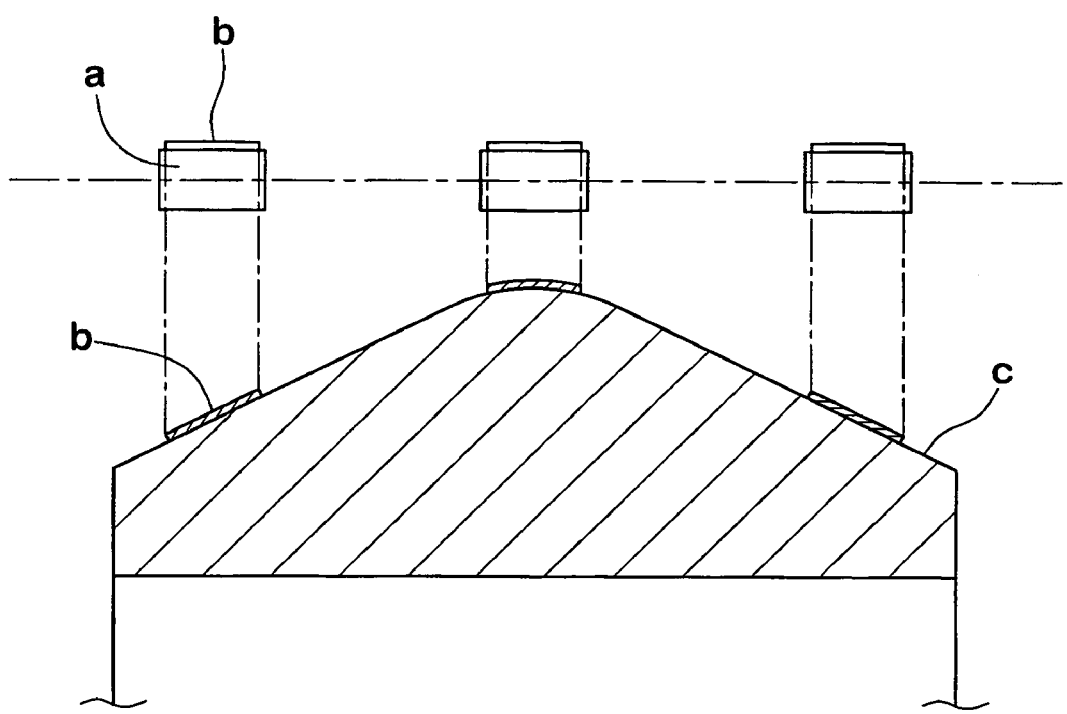
FIG. 12 is a sectional view used for explaining another conventional problem.

FIG. 9 shows another example of the applicator 17. The applicator 17 support the vertically moving stage 22B of the vertically moving means 22 such that the vertically moving stage 22B can forwardly and backwardly move, and in this example, the Y-axis direction is a vertical direction. The Z-axis direction is directed to a longitudinal direction, and the tiltable stage 23B of the tilting means 23 is supported such that the tiltable stage 23B can tilt around the horizontal reference axis zi. The axis 16i of the sending-out roller 16 is disposed on the tilting reference plane 29 which is perpendicular to the horizontal Z-axis direction. Thus, the sending-out roller 16 can laterally move within the vertical reference plane 29 while changing the inclination angle α.

Although the especially preferable embodiment of the present invention has been described above, the invention is not limited to the illustrated embodiment, and the invention can variously be modified and carried out. The winding body of the rubber strip is not limited to the rubber material for a tire, and the winding body can also be applied to rubber materials of various purposes.

EXAMPLE TIRE A OF THE PRESENT INVENTION

Using the rubber winding apparatus according to the present invention in which the sending-out roller can tilt, a rubber strip was spirally wound on a former whose belt layer was previously formed in accordance with the specification shown in Table 1, to form a winding body for a tread rubber for a four-wheel vehicle tire. Using the winding body, radial tires for a passenger vehicle having tire size of 215/45ZR17 were prototyped, and a generation status of defects on an outer surface and a uniformity of the tires were compared and evaluated.

The former is of a straight cylindrical shape. In a conventional example A1, in example tires A1 to A3 of the present invention, the sending-out roller 16 laterally moves such that its bisector point No passes through a running line (straight line) which is parallel to the axis 4i of the former.

(1) Generation Status of Defects;

Status of bare on a tread outer surface of each of 30 tires in each example were visually checked, and evaluated in accordance with the following references A, B and C.

A: Generation of bare is not found.

B: A small defect is found (light level, no correction is required).

C: A serious defect is found (serious level, correction is required).

(2) Uniformity;

Using a force variation (FV) tester, RFV (O.A.) was measured under the standard of JASO C607, and the average value of 30 prototyped tires of each example is described.

TABLE 1

|  | Conventional example A1 | Example tire A1 of the invention | Example tire A2 of the invention | Example tire A3 of the invention |
| --- | --- | --- | --- | --- |
| Sending-out roller |  |  |  |  |
| Running line | Straight line | Straight line | Straight line | Straight line |
| Movement in Y-axis direction | Absence | Absence | Absence | Absence |
| Tilting within tilting reference plane | Absence | Presence | Presence | Presence |
| Range (°) of the inclination angle α | — | 0-45 | 0-45 | 0-45 |
| Control of the inclination angle α | Absence | Presence | Presence | Presence |
| (α/(αc) | — | 1 | 0.6 | 0.4 |
| Angle θ (°) | — | 0 | 0 | 0 |
| Generation status of defects |  |  |  |  |
| Level A | 23 | 26 | 27 | 28 |
| Level B | 4 | 2 | 2 | 2 |
| Level C | 3 | 2 | 1 | 0 |
| Uniformity (N) | 53 | 46 | 46 | 43 |

EXAMPLE TIRE B OF THE PRESENT INVENTION

Using the rubber winding apparatus, winding body for a tread rubber of a tire for an automatic two-wheeled vehicle was formed in accordance with the specification shown in Table 2. Using the winding body, tires for an automatic two-wheeled vehicle having tire size of 190/55R17 were prototyped, and a generation status of defects on an outer surface and a uniformity of the tires were compared and evaluated.

The former has a drum-like contour shape, and a difference of a diameter DC at its central portion and a diameter Ds at its each of opposite ends was 120 mm, and a width of the former was 185 mm. In a conventional example B1 and an example tire B1 of the present invention, a bisector point No thereof laterally moves through a running line (straight line) which is in parallel to the axis 4i of the former. In an example tire B2 of the present invention, a bisector point No of the sending-out roller 16 laterally moves through a running line (convex curve) which is in parallel to a contour line of the former.

The evaluation references of the generation status of defects and the uniformity are the same as those of the example tire A of the present invention.

TABLE 2

|  | Conventional example B1 | Example tire B1 of the invention | Example tire B2 of the invention |
|---|---|---|---|
| Sending-out roller |  |  |  |
| Running line | Straight line | Straight line | Convex curve |
| Movement in Y-axis direction | Absence | Absence | Presence |
| Tilting within tilting reference plane | Absence | Presence | Presence |
| Range (°) of the inclination angle α | — | 0-45 | 0-45 |
| Control of the inclination angle α | Absence | Presence | Presence |
| Generation status of defects |  |  |  |
| Level A | 24 | 26 | 29 |
| Level B | 3 | 3 | 1 |
| Level C | 3 | 1 | 0 |
| Uniformity (N) | 51 | 47 | 44 |

What is claimed is:

1. A producing method of a rubber strip winding body in which an unvulcanized rubber strip is supplied to an outer peripheral surface of a rotating cylindrical body from a sending-out roller which laterally moves in an X-axis direction parallel to an axis of the cylindrical body, thereby spirally winding the rubber strip to form a winding body, wherein
in a tilting reference plane defined as a plane which is in parallel to a plane passing through the axis of the cylindrical body and which passes through an axis of the sending-out roller,
the sending-out roller is held such that the sending-out roller can tilt positively and negatively within an inclination angle of 0 to 45° with respect to a tilting reference line which passes through a bisector point on the axis of the sending-out roller bisecting a length of the sending-out roller and which is parallel to the axis of the cylindrical body, in which the center axis of the tilting motion of the sending-out roller passes through the bisector point and is perpendicular to the X-axis direction and a Y-axis direction perpendicular to the X-axis direction, and
the sending-out roller is laterally moved in the X-axis direction, while changing the inclination angle, in such a manner that the sending-out roller can forwardly and backwardly move to the cylindrical body along the Y-axis direction.

2. The producing method of the rubber strip winding body according to claim 1, wherein the sending-out roller changes the angle in accordance with the inclination of a wound and overlapped surface of the winding body portion when the rubber strip is wound and overlapped around the winding body portion which is already formed on the cylindrical body.

3. The producing method of the rubber strip winding body according to claim 1, wherein the sending-out roller changes the angle in accordance with a contour shape of the outer peripheral surface of the cylindrical body.

4. The producing method of the rubber strip winding body according to claim 1, wherein the sending-out roller laterally moves such that the bisector point of the sending-out roller passes on one running line which is parallel to the axis of the cylindrical body.

5. The producing method of the rubber strip winding body according to claim 1, wherein the sending-out roller laterally moves such that the bisector point of the sending-out roller passes on one running line which is parallel to a contour line of the cylindrical body.

6. The producing method of the rubber strip winding body according to claim 1, wherein the plane which passes through the axis of the cylindrical body passes a contact position Q where the rubber strip from the sending-out roller comes into contact with the cylindrical body.

7. The producing method of the rubber strip winding body according to claim 1, wherein the tilting reference plane is a horizontal plane.

8. The producing method of the rubber strip winding body according to claim 1, wherein a lateral moving amount of the sending-out roller is stored whenever the cylindrical body is rotated once, and the inclination angle of the sending-out roller is controlled in accordance with the lateral moving amount whenever the cylindrical body is rotated once.

9. A rubber strip winding apparatus in which an unvulcanized rubber strip is supplied to an outer peripheral surface of a rotating cylindrical body from a sending-out roller which laterally moves in an axial direction of the cylindrical body, thereby spirally winding the rubber strip to form a winding body, wherein
the rubber strip winding apparatus comprises an applicator having the sending-out roller,
the applicator comprises
laterally moving means which laterally moves the sending-out roller along an X-axis direction which is parallel to the axis of the cylindrical body,
longitudinally moving means which forwardly and backwardly moves the sending-out roller toward the cylindrical body along a Y-axis direction which intersects with the X-axis direction at right angles, and
tilting means for tilting the sending-out roller positively and negatively within an inclination angle of 0 to 45° with respect to a tilting reference line which extends in the X-axis direction passing through a bisector point on an axis of the sending-out roller which bisects a length of the sending-out roller, around a reference axis of the Z-axis direction which is perpendicular to the X-axis direction and the Y-axis direction and which passes through the bisector point.

10. The rubber strip winding apparatus according to claim 9, wherein the applicator further comprises control means which controls the laterally moving means the longitudinally moving means and the tilting means,
in a tilting reference plane defined as a plane which is in parallel to a plane passing through an axis of the cylindrical body and which passes through an axis of the sending-out roller, the control means changes the inclination angle of the sending-out roller in accordance with an inclination of a wound and overlapped surface of the winding body portion when the rubber strip is wound and overlapped on the winding body portion which is already formed on the cylindrical body.

11. The rubber strip winding apparatus according to claim 9, wherein the applicator further comprises control means which controls the laterally moving means, the longitudinally moving means and the tilting means, in a tilting reference plane defined as a plane which is in parallel to a plane passing through an axis of the cylindrical body and which passes through an axis of the sending-out roller, the control means changes the inclination angle of the sending-out roller in accordance with a contour shape of an outer peripheral surface of the cylindrical body.

12. The rubber strip winding apparatus according to claim 9, wherein the sending-out roller laterally moves such that the bisector point of the sending-out roller passes on one running line which is parallel to the axis of the cylindrical body.

13. The rubber strip winding apparatus according to claim 9, wherein the sending-out roller laterally moves such that the bisector point of the sending-out roller passes on one running line which is parallel to a contour line of the cylindrical body.

14. The rubber strip winding apparatus according to claim 9, wherein the reference axis extends in a vertical direction.

* * * * *

UNITED STATES PATENT AND TRADEMARK OFFICE
CERTIFICATE OF CORRECTION

PATENT NO. : 7,510,616 B2  
APPLICATION NO. : 11/248572  
DATED : March 31, 2009  
INVENTOR(S) : Norio Hayashi et al.

Page 1 of 1

It is certified that error appears in the above-identified patent and that said Letters Patent is hereby corrected as shown below:

Title Page, item [73] Assignee: should read as follows:

Sumitomo Rubber Industries, Ltd.

Signed and Sealed this

Twenty-eighth Day of July, 2009

JOHN DOLL  
*Acting Director of the United States Patent and Trademark Office*